(12) United States Patent
Horiuchi

(10) Patent No.: US 8,640,754 B2
(45) Date of Patent: Feb. 4, 2014

(54) RUN FLAT TIRE

(75) Inventor: Kenji Horiuchi, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 257 days.

(21) Appl. No.: 13/111,913

(22) Filed: May 19, 2011

(65) Prior Publication Data

US 2011/0284143 A1    Nov. 24, 2011

(30) Foreign Application Priority Data

May 21, 2010  (JP) ................ 2010-116967

(51) Int. Cl.
*B60C 17/00* (2006.01)
*B60C 15/00* (2006.01)
*B60C 9/20* (2006.01)

(52) U.S. Cl.
CPC ......... *B60C 17/0009* (2013.04); *B60C 17/0027* (2013.04); *B60C 15/0009* (2013.04); *B60C 15/0018* (2013.04); *B60C 15/00* (2013.01); *B60C 9/005* (2013.04); *B60C 2017/0063* (2013.04)
USPC ........... 152/517; 152/525; 152/527; 152/539; 152/546; 152/550; 152/554

(58) Field of Classification Search
USPC .......... 152/517, 525, 527, 539, 546, 550, 554
See application file for complete search history.

(56) References Cited

U.S. PATENT DOCUMENTS

| | | | |
|---|---|---|---|
| 4,261,405 A * | 4/1981 | Yamauchi et al. | 152/517 X |
| 6,269,857 B1 * | 8/2001 | Kanai et al. | 152/517 |
| 2007/0119534 A1* | 5/2007 | Katsuno | 152/517 |
| 2010/0147439 A1* | 6/2010 | Koeune et al. | |

FOREIGN PATENT DOCUMENTS

| | | |
|---|---|---|
| JP | 07-304312 | 11/1995 |
| JP | 2009-061866 | 3/2009 |

* cited by examiner

*Primary Examiner* — Adrienne C Johnstone
(74) *Attorney, Agent, or Firm* — Thorpe North & Western LLP

(57) ABSTRACT

A side wall reinforced run flat tire, wherein a second carcass layer that does not reach a bead core is disposed along the outer peripheral surface of a carcass layer. A position of an outer peripheral edge of a bead filler, a relationship between a rubber thickness Gc of the inner side and a rubber thickness Ga of an outer side taken on the line X normal to the rim line and centered on the carcass layer, a relationship between the rubber thicknesses Ga and Gb of the side wall rubber in an upper region of a bead portion, and a position of a folded up end of the carcass layer are each stipulated.

16 Claims, 4 Drawing Sheets

RUN FLAT TIRE

PRIORITY CLAIM

Priority is claimed to Japan Patent Application Serial No. 2010-116967 filed on May 21, 2010.

BACKGROUND

1. Technical Field

The present technology relates to a run flat tire, and particularly relates to a run flat tire configured so as to have both durability when run-flat traveling and riding comfort when regular traveling.

2. Related Art

In run flat tires provided with a side reinforcing layer having a falcated cross-section on an inner surface side of a side wall portion, methods such as increasing a thickness of the side reinforcing layer and using a rubber with a high hardness have been used in order to ensure durability when run-flat traveling. However, when only these sorts of technologies are applied there are problems in that the degree of excellent run flat durability that can be ensured is limited and riding comfort when regular traveling is significantly worsened due to the increase in side wall stiffness.

Particularly, when the tire cross-sectional height reaches a certain height, tire breakdowns when run-flat traveling consist mainly of breakdowns in the vicinity of the rim cushion near the bead portion. Therefore, there is a demand for technology that prevents such tire breakdowns and, simultaneously, ensures riding comfort.

Technology has been proposed to solve this problem wherein a mitigating rubber layer is disposed in the vicinity of a rim line on an outer side, in a tire axial direction, of a folded up portion a carcass layer, wherein, when a side wall portion buckles, the mitigating rubber layer exerts a mitigating action with respect to the upthrust by a rim flange between the carcass folded up portion and the rim flange in order to prevent rupturing in that area (e.g. see Japanese Unexamined Patent Application Publication No. H07-304312A). Additionally, technology has been proposed wherein a folded up end of a carcass layer is distanced from a region which contacts a rim flange top edge in order to suppress the generation and/or expansion of cracking due to the concentration of stress in the vicinity of the folded up end of the carcass layer (e.g. see Japanese Unexamined Patent Application Publication No. 2009-61866A).

However, both of these proposals are limited as to effectiveness in enhancing run-flat durability, and, at the same time, do not directly lead to improvements in the effectiveness of enhancing riding comfort when regular traveling. Therefore, neither provides technology that can sufficiently satisfy the demand for both run-flat durability and riding comfort.

SUMMARY

The present technology provides a run flat tire configured so as to have both durability when run-flat traveling and riding comfort when regular traveling. The run flat tire includes at least one layer of a carcass layer provided around bead cores embedded in a left-right pair of bead portions and folded over from a tire inner side toward a tire outer side so as to envelop bead fillers that are disposed on an outer circumferential side of the bead cores. A plurality of belt layers is disposed on an inner circumferential side of a tread portion, a belt cover layer is disposed on the outer circumferential side of the belt layers, and a side reinforcing layer having a falcated cross-section is disposed between the carcass layer and an inner liner layer of the side wall portion. A second carcass layer is disposed having an edge on a tire inner wall surface side of the bead filler along an outer peripheral surface of the carcass layer and having an end between the outer peripheral surface of the bead core and an outer peripheral edge of the bead filler, wherein the outer peripheral edge of the bead filler is positioned more to an inward side in a tire radial direction than a line normal to a rim line of an outer wall surface of the bead portion. Ga can be defined as a rubber thickness taken on a line normal to the rim line between the carcass layer and an outer wall surface of the side wall portion, and Gb can be defined as a maximum rubber thickness taken on a line normal to the second carcass layer between the second carcass layer and the outer wall surface of the side wall portion. A relationship between Ga and Gb is 0.65 Gb<Ga<0.85 Gb. Gc can be defined as a rubber thickness taken on a line normal to the rim line between the carcass layer and a tire inner wall surface, and a relationship between Gc and Ga is 0.85Ga<Gc<1.00Ga. In at least one of the side wall portions, a folded up end of the carcass layer is configured so as to be positioned in a range of within 5 mm of both sides along the second carcass layer, demarcated by a point on the second carcass layer where the rubber thickness between the second carcass layer and the outer wall surface of the side wall portion reaches a maximum.

Furthermore, the configuration described above may be further configured as described in (1) to (3) below.

(1) The side reinforcing layer having a falcated cross-section is formed from an inner side rubber and an outer side rubber that are connected in the tire radial direction. The inner side rubber of the rubber forming the side reinforcing layer has a higher JIS-A (Japanese Industrial Standard A) hardness than the outer side rubber. In this case, the outer side rubber of the rubber forming the side reinforcing layer preferably has a lower tan δ at 60° C. than the inner side rubber.

(2) The folded up end of the carcass layer is configured so as to extend to an inner side of the belt layer in one of the side wall portions. In this case, the side wall portion having the folded up end of the carcass layer extended to the inner side of the belt layer is preferably provided on a vehicle side of a tire when a wheel is provided with a negative camber angle or a wheel is not provided with a camber angle; and on an outer side of a tire when a wheel is provided with a positive camber angle.

(3) The belt cover layer includes a composite fiber cord that is formed by twisting a low elasticity yarn and a high elasticity yarn having differing elastic moduli together.

With the present technology, the second carcass layer having the end that does not reach the outer peripheral surface of the bead core is disposed along the outer peripheral surface of the carcass layer. Therefore, the second carcass layer, which is freed from shearing strain caused by tension applied to the carcass layer, enhances the stiffness of the crown portion. This results in excellent steering stability and riding comfort being displayed when regular traveling and also makes possible the enhancement of run flat durability by suppressing buckling of the tread portion when run-flat traveling.

Moreover, the outer peripheral edge of the bead filler is positioned more to the inward side in the tire radial direction than the line X normal to the rim line. Therefore, the outer peripheral edge of the bead filler is distanced from the region prone to being subjected to the large amount of stress caused by contact pressure with the rim when run-flat traveling. Thus, shearing stress acting on the end of the bead filler can be suppressed and run-flat durability can be enhanced due to separation of the rubber in this area being suppressed.

Additionally, the relationship between the rubber thickness Ga, taken on the line X normal to the rim line between the carcass layer and the outer wall surface of the side wall portion, and the maximum rubber thickness Gb, taken on the line normal second carcass layer between the second carcass layer and the outer wall surface of the side wall portion, is set within a predetermined range; and a ratio of variation in the rubber thickness in the tire radial direction on the outer side of the carcass layer is restricted. As a result, localized, concentrated stress caused by contact pressure with the rim is mitigated, which leads to separation breakdowns of the rubber near the rim cushion being suppressed when run-flat traveling and, at the same time, rubber thickness in the upper region of the bead portion being ensured. Therefore, riding comfort when regular traveling can be enhanced.

Furthermore, a large rubber thickness Gc taken on the line X normal to the rim line between the carcass layer and the tire inner wall surface is ensured, and the rubber thickness Gc is set so as to be close to the rubber thickness Ga described above. As a result, it is possible to mitigate shearing stress acting between the carcass layer and the second carcass layer, which leads to separation breakdowns therebetween being suppressed. Particularly, durability when run-flat traveling can be enhanced, and, at the same time, riding comfort during regular traveling can be enhanced due to rubber thickness being maintained in regions where great deformation occurs due to input from the rim.

Additionally, the folded up end of the carcass layer is disposed in the vicinity of a position where the rubber thickness between the outer wall surfaces of the side wall portions reaches a maximum. Therefore, separation breakdowns from the folded up end of the carcass layer are suppressed and, particularly, durability when run-flat traveling can be enhanced.

DETAILED DESCRIPTION

Detailed descriptions will be given below of a configuration of the present technology with reference to the accompanying drawings.

Figure 1:
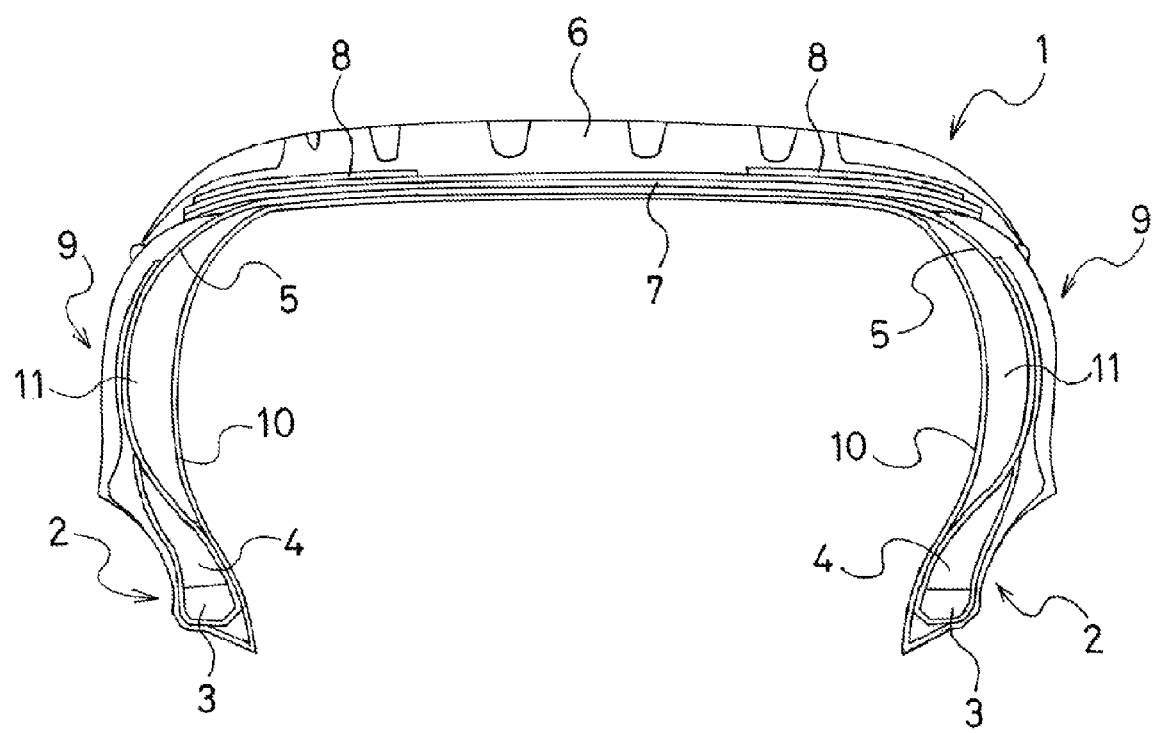
FIG. 1 is a cross-sectional view illustrating a construction of a run flat tire having a form in which a side reinforcing layer is disposed on an inner surface side of a side wall portion.

FIG. 1 is a cross-sectional view illustrating a construction of a run flat tire having a form in which a side reinforcing layer is disposed on an inner surface side of a side wall portion.

In FIG. 1, a run flat tire 1 includes at least one layer of a carcass layer 5 provided around bead cores 3,3 embedded in a left-right pair of bead portions 2,2 and folded over from a tire inner side toward a tire outer side so as to envelop bead fillers 4,4 that are disposed on an outer circumferential side of the bead cores 3,3, wherein a plurality of belt layers 7 are disposed on an inner circumferential side of a tread portion 6, a belt cover layer 8 is disposed on the outer circumferential side of the belt layers 7, and a side reinforcing layer 11 having a falcated cross-section is disposed between the carcass layer 5 and an inner liner layer 10 of side wall portions 9,9.

Figure 2:
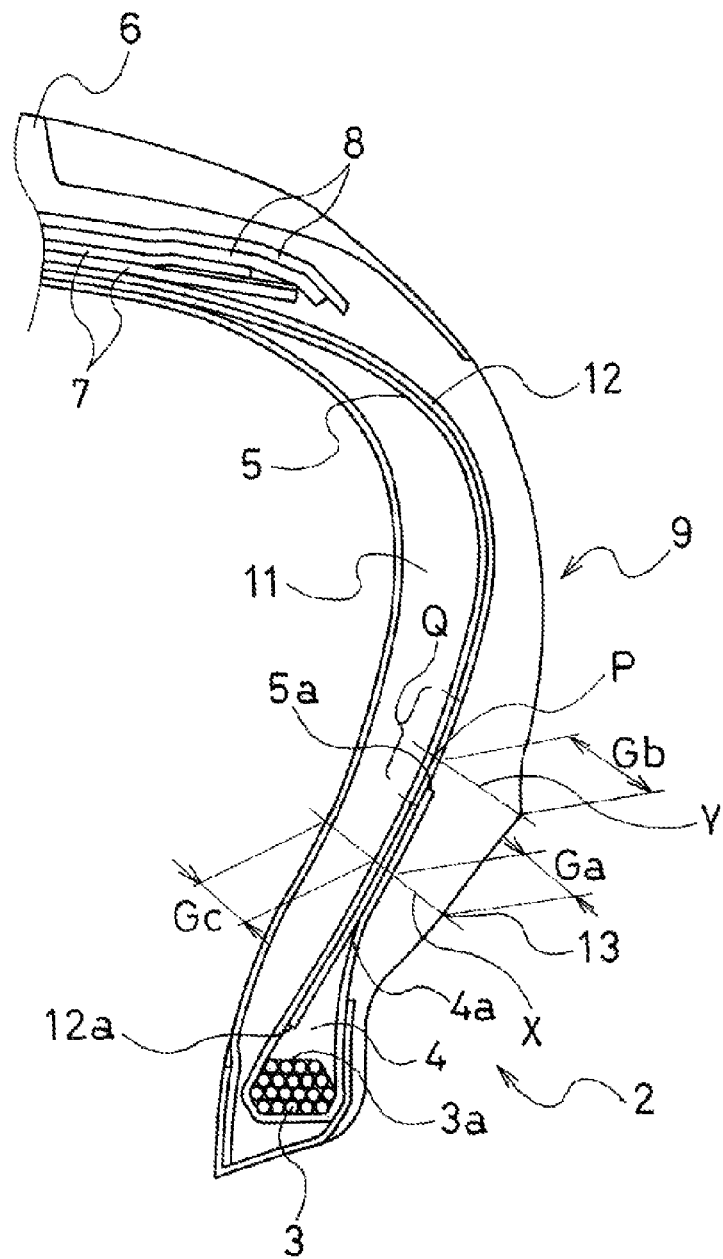
FIG. 2 is a cross-sectional view illustrating an enlarged example of a side wall portion of a run flat tire according to an embodiment of the present technology.

Moreover, as illustrated in FIG. 2, in the present technology a second carcass layer 12 is disposed having an edge on a tire inner wall surface side of the bead filler 4 along an outer peripheral surface of the carcass layer 5 and having an end 12a between the outer peripheral surface 3a of the bead core 3 and an outer peripheral edge 4a of the bead filler 4. The outer peripheral edge 4a of the bead filler 4 is positioned more to an inward side in a tire radial direction than a line X normal to a rim line 13 of an outer wall surface of the bead portion 2. Note that "rim line 13" described above refers to a thin line extending in a tire circumferential direction that is provided on the outer wall surface of the bead portion 2 so that the interlocked state of the tire and the rim can be externally determinable.

Thus, the second carcass layer 12 having the end 12a that does not reach the outer peripheral surface 3a of the bead core 3 is disposed along the outer peripheral surface of the carcass layer 5. Therefore, the second carcass layer 12, which is freed from shearing strain caused by tension applied to the carcass layer 5, enhances the stiffness of a crown portion. This results in excellent steering stability and riding comfort being displayed when regular traveling and also makes possible the enhancing of run flat durability by suppressing buckling of the tread portion 6 when run-flat traveling.

Moreover, the outer peripheral edge 4a of the bead filler 4 is positioned more to the inward side in the tire radial direction than the line X normal to the rim line 13 of the outer wall surface of the bead portion 2. Therefore, the outer peripheral edge 4a of the bead filler 4 is distanced from the region prone to being subjected to the large amount of stress caused by contact pressure with the rim when run-flat traveling. Thus, shearing stress acting on the end of the bead filler 4 can be suppressed, and run-flat durability can be enhanced due to separation of the rubber in this area being suppressed.

Furthermore, in the present technology, when Ga is a rubber thickness taken on the line X normal to the rim line 13 between the carcass layer 5 and an outer wall surface of a side wall portion 9, and Gb is a maximum rubber thickness taken on a line normal to the second carcass layer 12 between the second carcass layer 12 and the outer wall surface of the side wall portion 9, a relationship between Ga and Gb is configured so as to be 0.65 Gb<Ga<0.85 Gb, and preferably 0.70 Gb<Ga<0.80 Gb. Note that in FIG. 2, Y is a line normal to the second carcass layer 12 at a position where the rubber thickness between the second carcass layer 12 and the outer wall surface of the side wall portion 9 is at a maximum.

Thus, the relationship between the rubber thickness Ga taken on the line X normal to the rim line 13 and the maximum rubber thickness Gb taken on the line normal to the second carcass layer 12 is set and a ratio of variation in the rubber thickness in the tire radial direction on the outer side of the carcass layer 5 located in the upper region of the bead portion 2 is restricted. As a result, localized, concentrated stress caused by contact pressure with the rim is mitigated, which leads to separation breakdowns of the rubber near the rim cushion when run-flat traveling being suppressed. Therefore, run-flat durability can be enhanced and, at the same time, riding comfort when regular traveling can be improved due to the rubber thickness in the upper region of the bead portion 2 being ensured.

Here, if the rubber thickness Ga taken on the line X normal to the rim line 13 is set so as to be 0.85 times or more of the maximum rubber thickness Gb taken along the line normal to the second carcass layer 12, the form of the carcass line will not be maintainable and/or a gross volume of the rubber will become excessively large, leading to the durability being inhibited.

Furthermore, in the present technology, when Gc is a rubber thickness taken on the line X normal to the rim line 13 between the carcass layer 5 and the tire inner wall surface, a relationship between Gc and Ga is 0.85Ga<Gc<1.00Ga, and preferably 0.90Ga<Gc<0.95Ga. Additionally, in at least one of the side wall portions 9, a folded up end 5a of the carcass layer 5 is configured so as to be positioned in a range (indicated as "Q" in the figures) of within 5 mm of both sides along the second carcass layer 12, demarcated by a point P on the second carcass layer 12 where the rubber thickness between the second carcass layer 12 and the outer wall surface of the side wall portion 9 reaches a maximum.

Thus, a large rubber thickness Gc taken on the line X normal to the rim line 13 between the carcass layer 5 and the tire inner wall surface is ensured, and the rubber thickness Gc is set so as to be close to the rubber thickness Ga described above. As a result, it is possible to mitigate shearing stress acting between the carcass layer 5 and the second carcass layer 12, which leads to separation breakdowns between the carcass layer 5 and the second carcass layer 12 caused by the shearing stress being suppressed. Particularly, durability when run-flat traveling can be enhanced, and, at the same time, riding comfort during regular traveling can be enhanced due to rubber thickness being maintained in regions where great deformation occurs due to input from the rim.

Moreover, the folded up end 5a of the carcass layer 5 is disposed in the vicinity of a position where the rubber thickness between the outer wall surfaces of the side wall portions 9 reaches a maximum. Therefore, separation breakdowns from the folded up end 5a of the carcass layer 5 are suppressed and, particularly, durability when run-flat traveling can be enhanced.

Here, if the rubber thickness Gc on the tire inner wall surface side taken on the line X normal to the rim line 13 is set so as to be greater than or equal to the rubber thickness Ga, the form of the carcass line will not be maintainable and/or a gross volume of the rubber will become excessively large, leading to the durability being inhibited.

Figure 3:
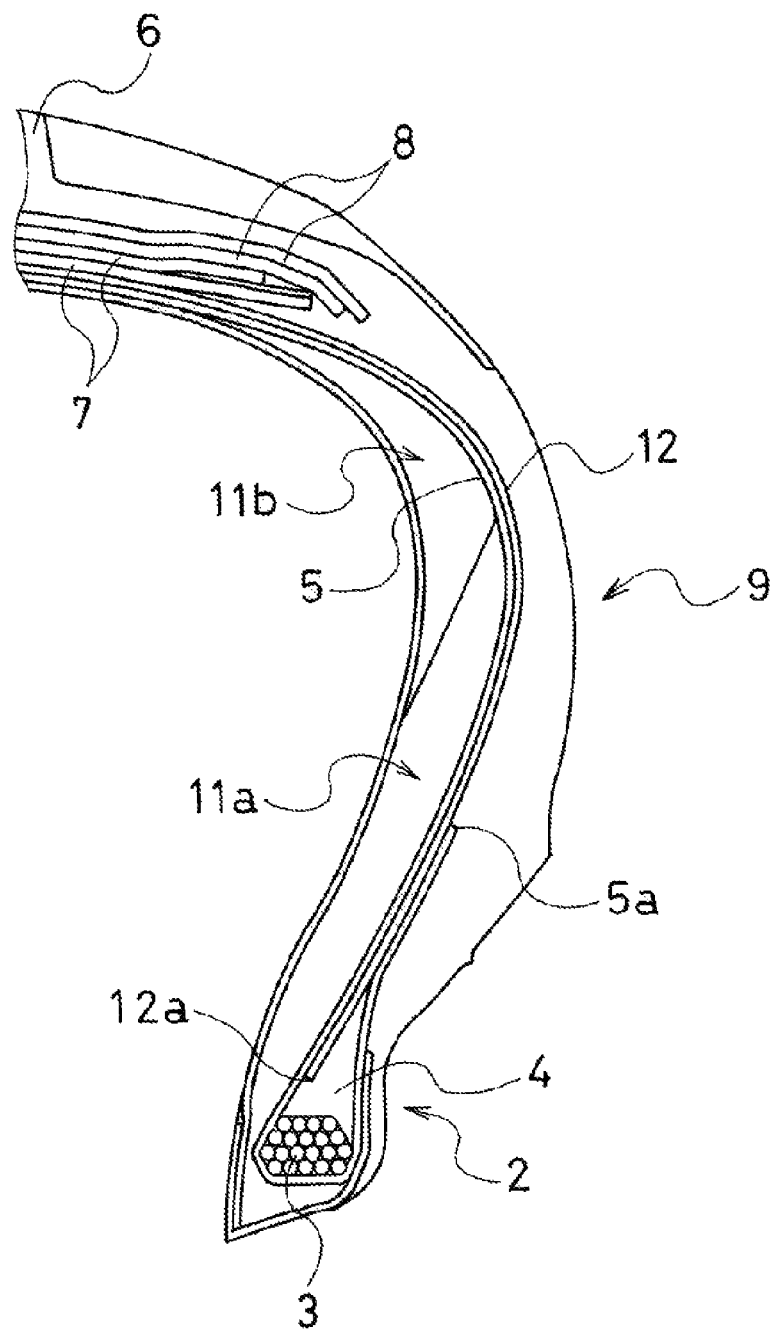
FIG. 3 is a cross-sectional view illustrating another enlarged example of a side wall portion of a run flat tire according to the embodiment of the present technology.

In the present technology, as illustrated in FIG. 3, the side reinforcing layer 11 described above is formed from an inner side rubber 11a and an outer side rubber 11b that are connected in the tire radial direction, and the inner side rubber 11a of the rubber forming the side reinforcing layer preferably has a higher JIS-A hardness than the outer side rubber 11b. Thereby, a soft rubber is disposed on the tread portion 6 side, resulting in the rubber in the vicinity of the shoulder being deformable, which leads to a reduction in the stress received from the rim and makes possible the further enhancement of riding comfort when regular traveling.

In this case, the outer side rubber 11b of the rubber forming the side reinforcing layer 11 more preferably has a lower tan δ at 60° C. than the inner side rubber 11a. Thereby, heat generation in the soft rubber on the tread portion 6 side is suppressed and durability can be enhanced.

Figure 4:
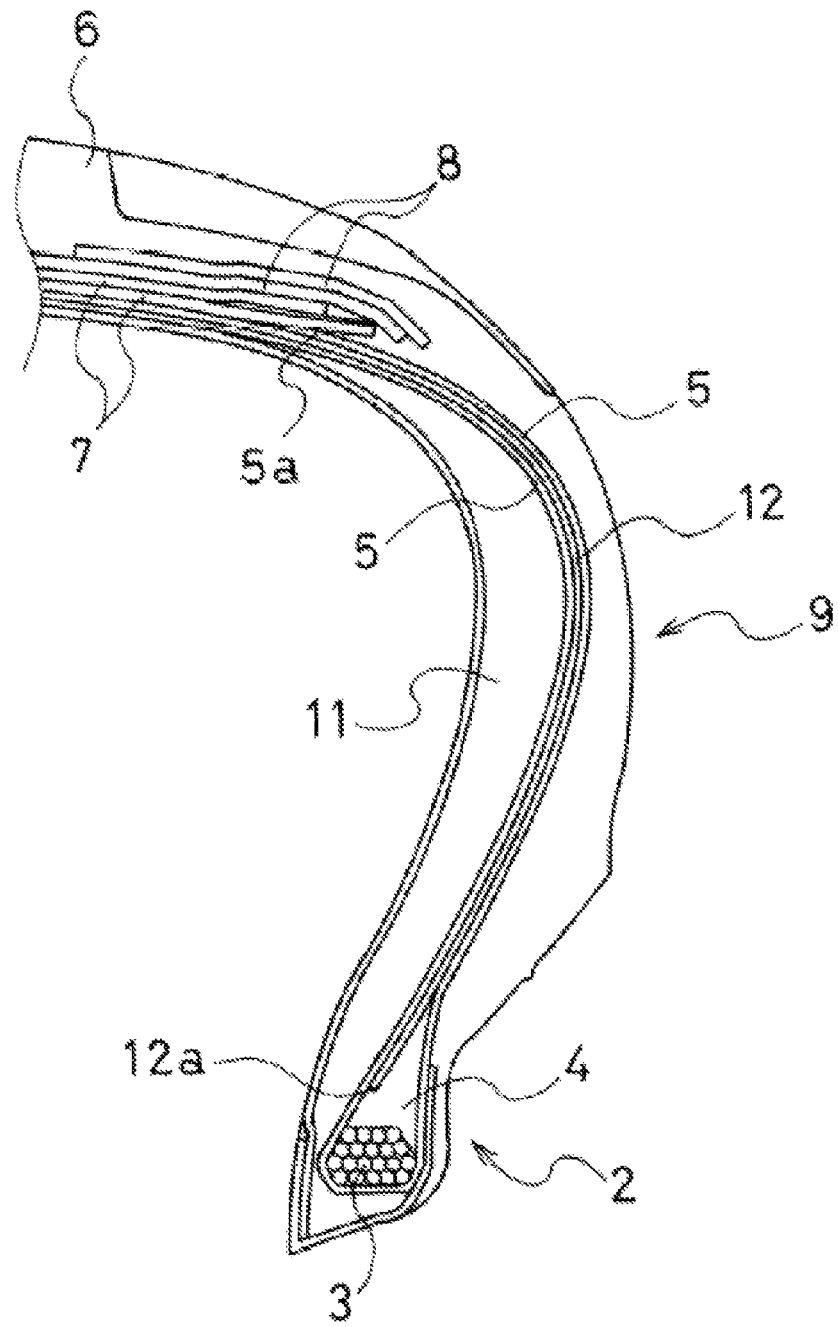
FIG. 4 is a cross-sectional view illustrating yet another enlarged example of a side wall portion of a run flat tire according to the embodiment of the present technology.

In the present technology, as illustrated in FIG. 4, the folded up end 5a of the carcass layer 5 can be extended to the inner side of the belt layers 7 in one of the side wall portions 9. Thereby, the side wall stiffness is increased and, at the same time, the folded up end 5a will be positioned on the inner side of the end of the belt layers 7 where comparatively little deformation occurs when traveling. Therefore, breakdowns due to cracking in the vicinity of the folded up end 5a are efficiently suppressed and run-flat durability can be enhanced.

In this case, the side wall portion 9 described above is preferably mounted on a vehicle side of a tire when a wheel is provided with a negative camber angle or a wheel is not provided with a camber angle; and on an outer side of a tire when a wheel is provided with a positive camber angle. Thereby, the load bearing functionality of the side wall portion 9 on the side having increased side wall stiffness is enhanced. Therefore, excellent steering stability can be ensured when run flat traveling and, of course, regular traveling and, at the same time, excellent run-flat durability can be ensured due to the suppression of breakdowns due to cracking in the vicinity of the folded up end 5a.

In the present technology, the belt cover layer 8 more preferably includes a composite fiber cord that is formed by twisting a low elasticity yarn and a high elasticity yarn having different elastic moduli together. Thus, by using the composite fiber cord, which is formed by twisting a low elasticity yarn and a high elasticity yarn together, as the belt cover layer 8, the drawbacks of low elasticity fiber cords of high heat along with that the recoverablility of distortions is difficult to obtain, and the drawbacks of high elasticity cords, namely problematic compression fatigue and adhesiveness, can be mutually compensated for.

Moreover, by appropriately selecting the type and physical properties of the composite fiber cord, stiffness in the crown portion is ensured, which leads to excellent steering stability and riding comfort being displayed when regular traveling and also makes possible the enhancing of run flat durability by suppressing buckling of the tread portion 6 when run-flat traveling.

As described above, in the run flat tire 1 of the present technology, the second carcass layer 12 is disposed along the outer peripheral surface of the carcass layer 5 so as to increase the stiffness of the crown portion; and the position of the outer peripheral edge 4a of the bead filler 4, the position of the folded up end 5a of the carcass layer 5, the relationship between the thicknesses Gc and Ga of the inner and outer rubbers taken on the line X normal to the rim line 13 and centered on the carcass layer 5, and the relationship between the thicknesses Ga and Gb of the side wall rubber in the upper region of the bead portion 2 are each stipulated. Thereby, localized, concentrated stress in the bead portion 2 caused by contact pressure with the rim is avoided, which leads to both run flat durability and riding comfort being achieved. Therefore, the run flat tire 1 of the present technology can be widely applied as a run flat tire for mounting on modern, high-performance vehicles.

EXAMPLES

Conventional Example, Working Examples 1 and 2, Comparative Examples 1 and 2

A conventional tire (Conventional Example), present technology tires (Working Examples 1 and 2), and comparative tires (Comparative Examples 1 and 2) were manufactured having a common tire size of 245/45R17 and a basic construction of the left and right side wall portions as illustrated in FIG. 2. The presence/absence of the second carcass layer 12, position of the outer peripheral edge 4a of the bead filler 4, rubber thicknesses Ga, Gb, and Gc in the upper region of the bead portion 2, and the position of the folded up end 5a of the carcass layer 5 were each varied as shown in Table 1.

These five types of tires were each mounted on the front and rear wheels of a front-engine front-wheel drive (FF)

vehicle having an engine displacement of 1,800 cc. Run-flat durability and riding comfort were evaluated via the test methods described below.

Note that in each of the tires, rayon fiber cord was used for each of the carcass layer 5 and the second carcass layer 12, steel cord was used for the belt layers 8,8, rubber having a JIS-A hardness of 80 was used for the side reinforcing layers 11, 11, and nylon fiber cord was used for the belt cover layers 8,8.

Run-Flat Durability

Each tire was assembled on a rim (size: 17×8.0J) and inflated to an air pressure of 230 kPa. The valve core of the right side drive axle tire (one of the four tires) was removed and the vehicle was run on an asphalt road surface test course at an average speed of 80 km/h. Running was continued until the driver felt vibration caused by the breakdown of the tire. Run-flat durability was evaluated based on the average running distance. Three experienced test drivers performed this evaluation and the results were averaged and recorded in Table 1 as index values with the value of the conventional tire being 100. Larger index values indicate superior run-flat durability.

Riding Comfort

Each tire was assembled on a rim (size: 17×8.0J) and inflated to an air pressure of 230 kPa. The vehicle was run on a dry asphalt road surface test course at an average speed of 80 km/h and three experienced test drivers performed a sensory evaluation. The results of the evaluations were tallied on a 5-point scoring scale with the score of the conventional tire being 3, and the average score thereof was recorded in Table 1. Larger index values indicate superior riding comfort.

For this tire, evaluations of run-flat durability and riding comfort were performed using the same test methods described above, and the results thereof, along with the results of the Conventional Example shown in Table 1, were recorded in Table 2.

TABLE 2

|  |  | Conventional Example | Working Example 3 |
|---|---|---|---|
| JIS-A rubber hardness of the side reinforcing layer 11 | Inner side rubber 11a | 80 | 85 |
|  | Outer side rubber 11b | 80 | 75 |
| Evaluation Results | Run-flat durability | 100 | 110 |
|  | Riding comfort | 3 | 4.7 |

It is evident from Table 2 that, compared to the tire of the Conventional Example, the tire of the Working Example of the present technology achieved run-flat durability and riding comfort at a high level.

Working Example 4

The folded up end 5a of the carcass layer 5 in the tire of Working Example 1 described above, as shown in Table 3, was configured to extend to the inner side of the edge of the belt layer 7 in one of the side wall portions 9, and was also configured so that the carcass layer 5 and the edge of the belt layer 7 overlapped 5 mm. Thus, a tire of Working Example 4 of the present technology was manufactured.

TABLE 1

|  |  | Conventional Example | Working Example 1 | Working Example 2 | Comparative Example 1 | Comparative Example 2 |
|---|---|---|---|---|---|---|
| Presence/absence of second carcass layer 12 |  | Absent | Present | Present | Present | Present |
| Position of the outer peripheral edge 4a of the bead filler 4 (distance from the normal line X along the carcass layer 5) |  | 5 mm to the upper side | 10 mm to the lower side | 10 mm to the lower side | 5 mm to the upper side | 10 mm to the lower side |
| Rubber thickness in the upper region of the bead portion 2 (mm) | Ga | 4.0 | 6.0 | 6.0 | 6.0 | 6.0 |
|  | Gb | 8.0 | 8.0 | 8.0 | 8.0 | 8.0 |
|  | Gc | 2.5 | 5.5 | 5.5 | 5.5 | 5.5 |
| Position of the folded up end 5a of the carcass layer 5 (distance from the point P along the carcass layer 5) |  | 45 mm to the lower side | 3 mm to the lower side | 3 mm to the upper side | 3 mm to the lower side | 15 mm to the upper side |
| Evaluation Results | Run-flat durability | 100 | 108 | 108 | 95 | 102 |
|  | Riding comfort | 3 | 4.0 | 4.0 | 3.3 | 2.3 |

It is evident from Table 1 that compared to the tires of the Conventional Example and the Comparative Examples, the tires of the Working Examples of the present technology enhance run-flat durability and riding comfort in a well-balanced manner.

Working Example 3

The side reinforcing layers 11,11 in the tire of Working Example 1 described above, as shown in Table 2, were fabricated from the inner side rubber 11a and the outer side rubber 11b that are connected in the tire radial direction and that have different JIS-A hardnesses to manufacture a tire of Working Example 3 of the present technology. Here, cross-sectional areas of the inner side rubber 11a and the outer side rubber 11b were equivalent.

For this tire, evaluations of run-flat durability and riding comfort were performed using the same test methods described above, and the results thereof, along with the results of the Conventional Example shown in Table 1, were recorded in Table 3.

TABLE 3

|  |  | Conventional Example | Working Example 4 |
|---|---|---|---|
| Position of the folded up end 5a of the carcass layer 5 |  | Lower side of P 45 mm | Under the edge of the belt layer 7 (5 mm overlap) |
| Evaluation Results | Run-flat durability | 100 | 110 |
|  | Riding comfort | 3 | 3.7 |

It is evident from Table 3 that, compared to the tire of the Conventional Example, the tire of the Working Example of the present technology achieved run-flat durability and riding comfort at a high level.

Working Example 5

The belt cover layers 8, 8 in the tire of Working Example 1 described above were fabricated from a composite fiber cord made by twisting low elasticity organic fibers made from nylon and high elasticity organic fibers made from aramid having different elastic moduli together. Thus, a tire of Working Example 5 of the present technology was manufactured.

For this tire, evaluations of run-flat durability and riding comfort were performed using the same test methods described above, and the results thereof, along with the results of the Conventional Example shown in Table 1, were recorded in Table 4.

TABLE 4

|  |  | Conventional Example | Working Example 5 |
|---|---|---|---|
| Material of belt cover layers 8, 8 | | Nylon fiber cord | Composite fiber cord |
| Evaluation Results | Run-flat durability | 100 | 110 |
| | Riding comfort | 3 | 4.3 |

It is evident from Table 4 that, compared to the tire of the Conventional Example, the tire of the Working Example of the present technology achieved run-flat durability and riding comfort at a high level.

What is claimed is:

1. A run flat tire comprising at least one layer of a carcass layer provided around bead cores embedded in a left-right pair of bead portions and folded over from a tire inner side toward a tire outer side so as to envelop bead fillers that are disposed on an outer circumferential side of the bead cores, wherein a plurality of belt layers is disposed on an inner circumferential side of a tread portion, a belt cover layer is disposed on the outer circumferential side of the belt layers, and a side reinforcing layer having a falcated cross-section is disposed between the carcass layer and an inner liner layer of the side wall portion; wherein
   a second carcass layer is disposed having an edge on a tire inner wall surface side of the bead filler along an outer peripheral surface of the carcass layer and having an end between the outer peripheral surface of the bead core and an outer peripheral edge of the bead filler, wherein the outer peripheral edge of the bead filler is positioned more to an inward side in a tire radial direction than a line normal to a rim line of an outer wall surface of the bead portion;
   Ga is a rubber thickness taken on a line normal to the rim line between the carcass layer and an outer wall surface of the side wall portion, Gb is a maximum rubber thickness taken on a line normal to the second carcass layer between the second carcass layer and the outer wall surface of the side wall portion, and a relationship between Ga and Gb is 0.65 Gb<Ga<0.85 Gb;
   Gc is a rubber thickness taken on a line normal to the rim line between the carcass layer and a tire inner wall surface, and a relationship between Gc and Ga is 0.85Ga<Gc<1.00Ga; and
   a folded up end of the carcass layer in at least one of the side wall portions is positioned in a range of within 5 mm of both sides along the second carcass layer, demarcated by a point on the second carcass layer where the rubber thickness between the second carcass layer and the outer wall surface of the side wall portion reaches a maximum.

2. The run flat tire according to claim 1, wherein the side reinforcing layer having a falcated cross-section is formed from an inner side rubber and an outer side rubber that are connected in the tire radial direction, and the inner side rubber of the rubber forming the side reinforcing layer has a higher JIS-A hardness than the outer side rubber.

3. The run flat tire according to claim 2, wherein the outer side rubber of the rubber forming the side reinforcing layer has a lower tan $\delta$ at 60° C. than the inner side rubber.

4. The run flat tire according to claim 1, wherein the folded up end of the carcass layer extends to an inner side of the belt layer in one of the side wall portions.

5. The run flat tire according to claim 1, wherein the belt cover layer comprises a composite fiber cord that is formed by twisting a low elasticity yarn and a high elasticity yarn having differing elastic moduli together.

6. The run flat tire according to claim 1, wherein the relationship between Ga and Gb is configured so as to be 0.70 Gb<Ga<0.85 Gb.

7. The run flat tire according to claim 1, wherein the relationship between Ga and Gb is configured so as to be 0.65 Gb<Ga<0.80 Gb.

8. The run flat tire according to claim 1, wherein the relationship between Ga and Gb is configured so as to be 0.70 Gb<Ga<0.80 Gb.

9. The run flat tire according to claim 1, wherein a relationship between Gc and Ga is 0.85Ga<Gc<0.95Ga.

10. The run flat tire according to claim 1, wherein a relationship between Gc and Ga is 0.90Ga<Gc<1.00Ga.

11. The run flat tire according to claim 1, wherein a relationship between Gc and Ga is 0.90Ga<Gc<0.95Ga.

12. The run flat tire according to claim 1, wherein the belt cover layer comprises a composite fiber cord that is formed by twisting low elasticity organic fibers and high elasticity organic fibers having differing elastic moduli together.

13. The run flat tire according to claim 12, wherein the low elasticity organic fiber comprises nylon and the high elasticity organic fibers comprise aramid.

14. The run flat tire according to claim 1, wherein the side reinforcing layer having a falcated cross-section is formed from an inner side rubber and an outer side rubber that are connected in the tire radial direction.

15. The run flat tire according to claim 1, wherein the side reinforcing layer is formed from an inner side rubber and an outer side rubber, the outer side rubber is softer than the inner side rubber.

16. The run flat tire according to claim 1, wherein the folded up end of the carcass layer in at least one of the side wall portions is positioned in a range of within 3 mm of both sides along the second carcass layer, demarcated by the point on the second carcass layer where the rubber thickness between the second carcass layer and the outer wall surface of the side wall portion reaches the maximum.

* * * * *